US007122738B2

(12) United States Patent
Kanamaru

(10) Patent No.: US 7,122,738 B2
(45) Date of Patent: Oct. 17, 2006

(54) ELECTRIC CONNECTION BOX

(75) Inventor: Masahiro Kanamaru, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/257,100

(22) Filed: Oct. 25, 2005

(65) Prior Publication Data

US 2006/0089029 A1 Apr. 27, 2006

(30) Foreign Application Priority Data

Oct. 25, 2004 (JP) .......................... P2004-310111

(51) Int. Cl.
*H02G 3/08* (2006.01)

(52) U.S. Cl. ............................ 174/50; 174/58; 174/59; 439/76.1; 439/76.2; 361/600

(58) Field of Classification Search .................. 174/50, 174/59, 58, 17 R; 439/76.2, 357, 76.1; 248/906; 361/600
See application file for complete search history.

(56) References Cited

U.S. PATENT DOCUMENTS 4,593,960 A * 6/1986 Millhimes et al. .......... 439/140
5,664,955 A * 9/1997 Arnett ........................ 439/135
5,746,976 A * 5/1998 Yamada et al. ............... 422/62
6,027,378 A * 2/2000 Abe et al. ................... 439/701

FOREIGN PATENT DOCUMENTS

| | | |
|---|---|---|
| JP | 55-129384 | 9/1980 |
| JP | 56-170885 | 12/1981 |
| JP | 58-65781 | 5/1983 |
| JP | 61-103871 | 7/1986 |
| JP | 2-272 | 1/1990 |
| JP | 8-289439 | 11/1996 |
| JP | 63-90920 | 6/1998 |

* cited by examiner

*Primary Examiner*—Dhiru R. Patel
(74) *Attorney, Agent, or Firm*—Sughrue Mion, PLLC

(57) ABSTRACT

In an electric connection box, first connectors of wire harnesses and second connectors of wire harnesses are received within a case body, and the first connectors are coupled respectively with the second connectors, and the pairs of coupled connectors are fixed to the case body. Slide rail portions are formed on an inner surface of a wall of the case body, and a connector holding plate is slidably mounted on the slide rail portions, and has a plurality of connector fixing portions spaced from each other in a direction of sliding of the connector holding plate. The plurality of pairs of coupled connectors are fixed to the plurality of connector fixing portions, respectively, and the connector holding plate is slid along the slide rail portions, and is inserted into the case body, thereby fixing the plurality of pairs of coupled connectors to the case body.

5 Claims, 7 Drawing Sheets

ELECTRIC CONNECTION BOX

BACKGROUND OF THE INVENTION

1. Field of the Invention

This invention relates to an electric connection box in which connectors, used, for example, to join wire harnesses, are coupled together, and the coupled connectors are fixed within a case.

2. Related Art

One conventional electric connection box of the type described is disclosed in Japanese Utility Model Publication No. JP S63-90920U, and is shown in FIGS. 6 and 7. As shown in FIGS. 6 and 7, this electric connection box 100 comprises a case 101, and this case 101 comprises an under case 103, and an upper case 102 attached to an upper side of the under case 103. Connector portions (not shown) are fixedly provided at suitable positions within the upper case 102. A connector fixing portion 104, comprising four retaining arms 104*a*, is provided within the under case 103. Harness inlet/outlet ports 105 are formed in opposed side walls of the under case 103, respectively.

A first wire harness WH1 is divided at its end portion into two branches, and first connectors 106*a* and 106*b* are connected to ends of these branches, respectively. A second wire harness WH2 is divided at its end portion into three branches, and second connectors 107*a* to 107*c* are connected to ends of these branches, respectively.

The first and second wire harnesses WH1 and WH2 are passed respectively through the harness inlet/outlet ports 105 into the case 101, so that the first and second connectors 106*a* and 106*b* and 107*a* to 107*c* are introduced into the case 101. The first connector 106*b* and the second connectors 107*b* and 107*c*, introduced into the case 101, are connected respectively to the connector portions (not shown) of the upper case 102. One pair of first and second connectors 106*a* and 107*a*, introduced into the case 101, are coupled together, and the coupled first and second connectors 106*a* and 107*a* (hereinafter referred to as "coupled connectors") are fixed to the connector fixing portion 104.

Namely, the first and second connectors 106*b*, 107*b* and 107*c* are fixed to the case 101 by fitting forces obtained by coupling these connectors to the respective connector portions (not shown). However, the coupled connectors 106*a* and 107*a*, joining the wire harnesses WH1 and WH2, are not fixed to the case 101 by coupling these connectors with each other, and therefore the coupled connectors 106*a* and 107*a* are fixed to the case 101 through the connector fixing portion 104. As a result, the coupled connectors 106*a* and 107*a*, joining the wire harnesses WH1 and WH2, are prevented from being moved within the case 101 by external vibrations and others.

In the above conventional electric connection box 100, however, when there are used a plurality of pairs of coupled connectors 106*a* and 107*a* for wire harness joining purposes or other purposes, connector fixing portions 104, corresponding in number to the plurality of pairs of coupled connectors, need to be provided within the under cover 103, and therefore a large space need to be secured within the under cover. And besides, when there are used the plurality of coupled connectors 106*a* and 107*a* for wire harness joining purposes or other purposes, attaching (or fixing) operations, corresponding in number to the plurality of pairs of coupled connectors, must be carried out. Furthermore, when removing the connectors, it is necessary to cancel a locked condition of each of the connector fixing portions 104, and therefore this removing operation is cumbersome.

SUMMARY OF THE INVENTION

Therefore, this invention has been made in order to solve the above problems, and an object of the invention is to provide an electric connection box in which a plurality of pairs of coupled connectors can be received in a small space, and besides an operation for introducing the plurality of pairs of coupled connectors into the electric connection box, as well as an operation for removing these coupled connectors, can be carried out easily.

(1) The invention is directed to an electric connection box comprising;

a case;

first and second connectors received with in the case, which are provided at end portions of wire harnesses respectively, and which are coupled to each other;

a slide rail portion formed on an inner surface of a wall of the case, and extending in a direction substantially perpendicular to a wire harness installation direction; and a connector holding plate on which at least one connector fixing portion is provided, wherein at least one pair of the first and second connectors coupled to each other are fixed at the connector fixing portion of the connector holding plate, which is slidably mounted into the slide rail portion.

(2) The electric connection box of the invention may be characterized in that a plate locking device is provided in a vicinity of an opening of the case to lock the connector holding plate to the case when the connector holding plate reaches a sliding-completed position.

(3) The electric connection box may be characterized in that plural pairs of the first and second connectors are fixed at a plurality of the connector fixing portions of the connector holding plate.

(4) The electric connection box may be characterized in that the plural pairs of first and second connectors fixed to the connector holding plate are arranged so that heights of the pairs of the first and second connectors decrease toward a leading end of the connector holding plate.

(5) The electric connection box of the invention may be characterized in that no hole is formed on a bottom of the case.

In the invention, the connector holding plate to which the plurality of pairs of coupled first and second connectors (hereinafter referred to as "coupled connectors") are fixed is slid along the slide rail portions, and by doing so, the plurality of pairs of coupled connectors can be fixed to the case. By withdrawing the connector holding plate along the slide rail portions, the coupled connectors and the end portions of the wire harnesses (connected to these connectors) can be taken out of the case. With this construction, the plurality of pairs of coupled connectors can be received in a small space, and besides by sliding the connector holding plate, the plurality of pairs of coupled connectors can be simultaneously introduced into and withdrawn from the case, and therefore the operation for introducing the plurality of pairs of coupled connectors into the electric connection box, as well as the operation for removing these connectors, can be carried out easily.

In the invention, the hand of the operator can easily reach the plate locking device, and therefore the operator can easily carry out the operation for canceling the locked condition of the plate locking device.

In the invention, during the withdrawal of the connector holding plate, the wire harnesses and others will not become caught by a step formed between any two adjacent coupled connectors, and therefore this withdrawing operation is not prevented, so that the operation for withdrawing the connector holding plate can be carried out easily.

In the invention, the intrusion of water into the case can be prevented as much as possible.

DETAILED DESCRIPTION OF THE PREFERRED EMBODIMENTS

One preferred embodiment of the present invention will now be described with reference to the drawings.

Figure 1:
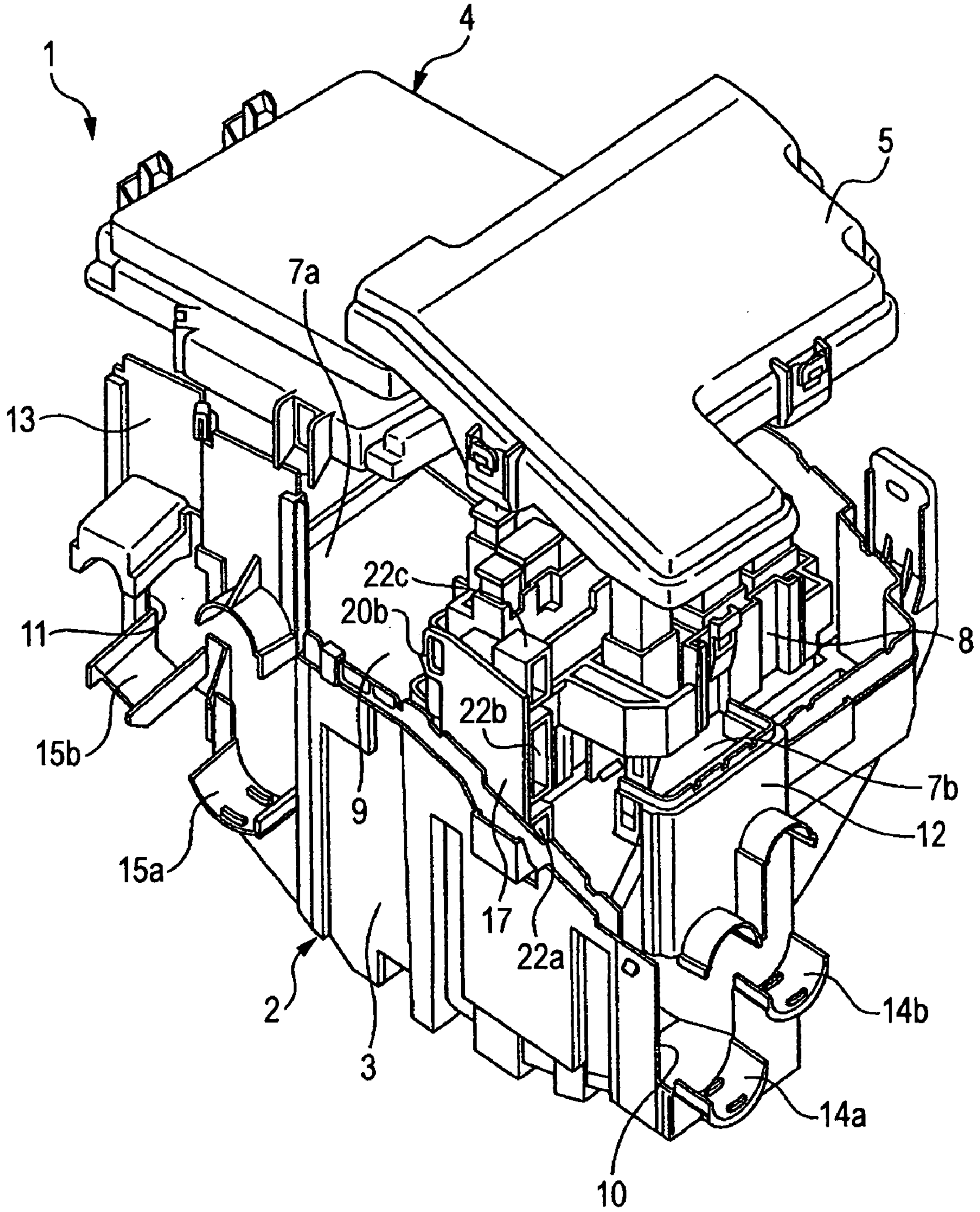
FIG. 1 is an exploded perspective view of one preferred embodiment of an electric connection box of the present invention.
Figure 2:
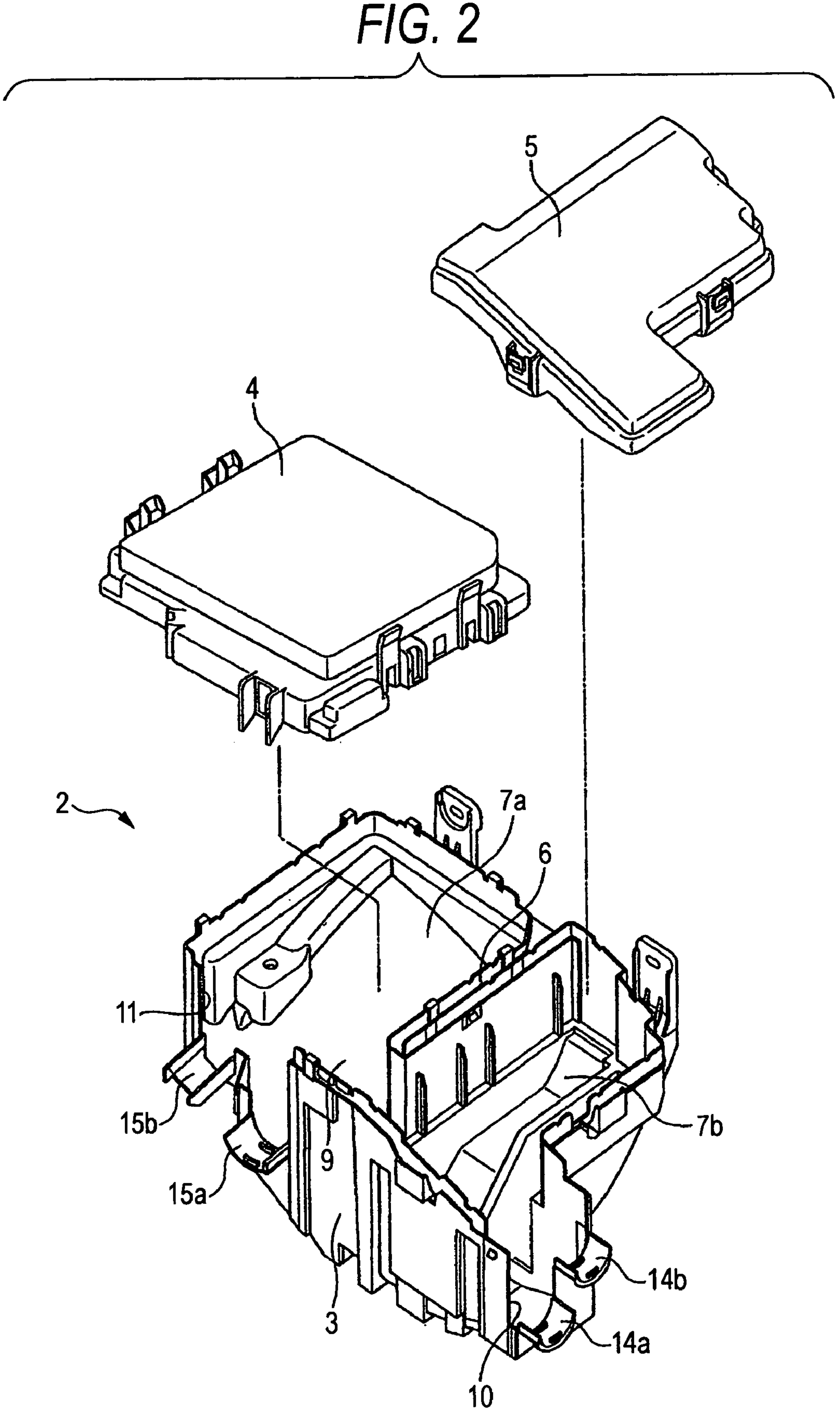
FIG. 2 is an exploded perspective view of a case of the electric connection box.
Figure 3:
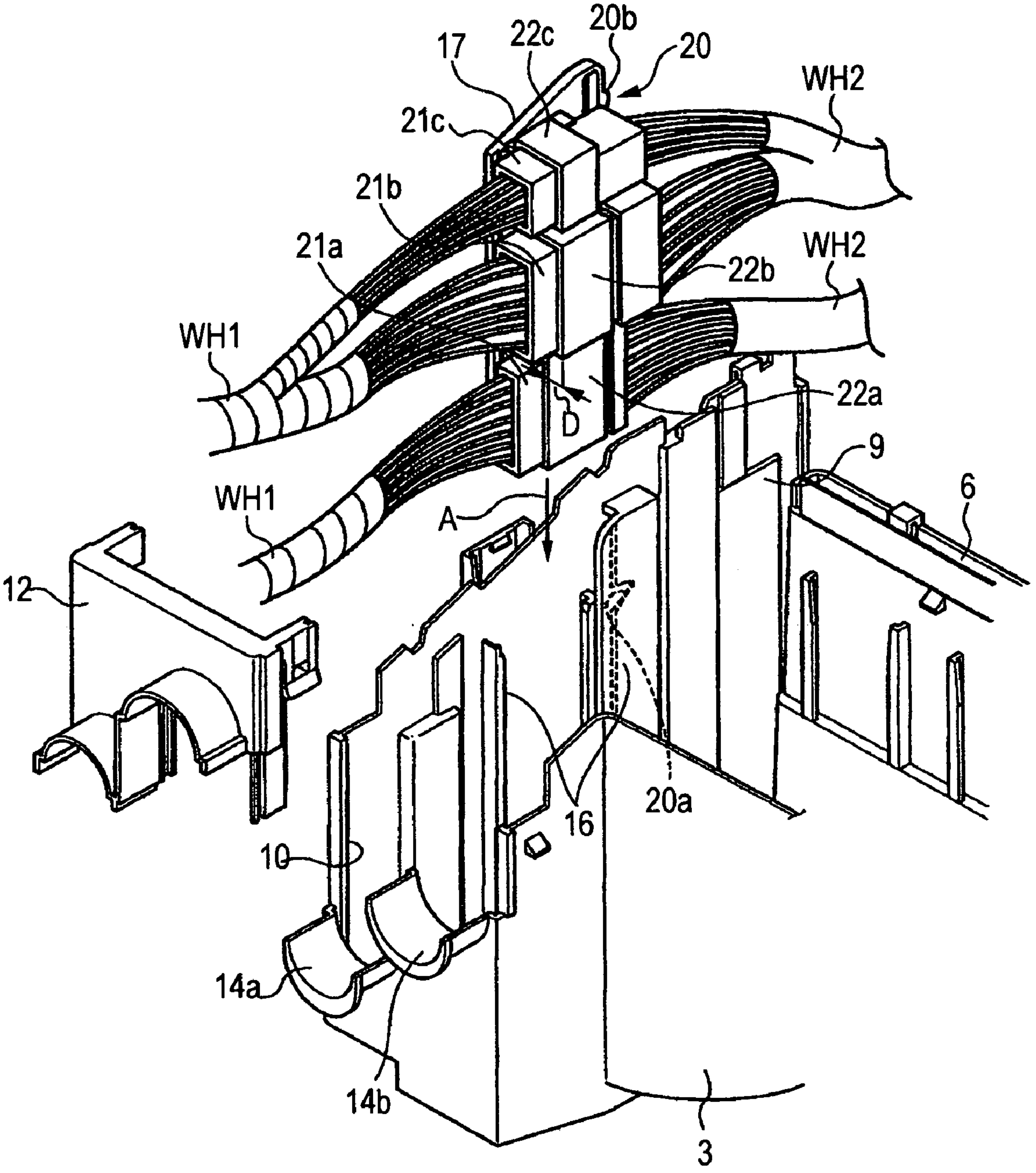
FIG. 3 is an exploded perspective view of an important portion of the electric connection box.
Figure 4:
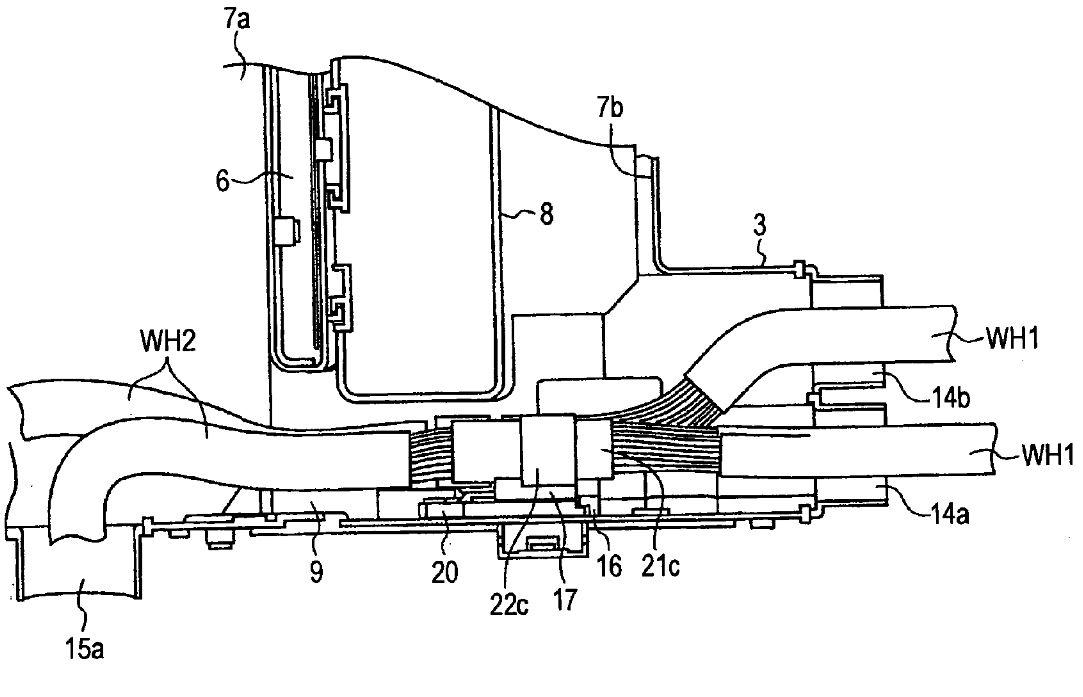
FIG. 4 is a plan view showing a condition in which connectors are received within the electric connection box.
Figure 5:
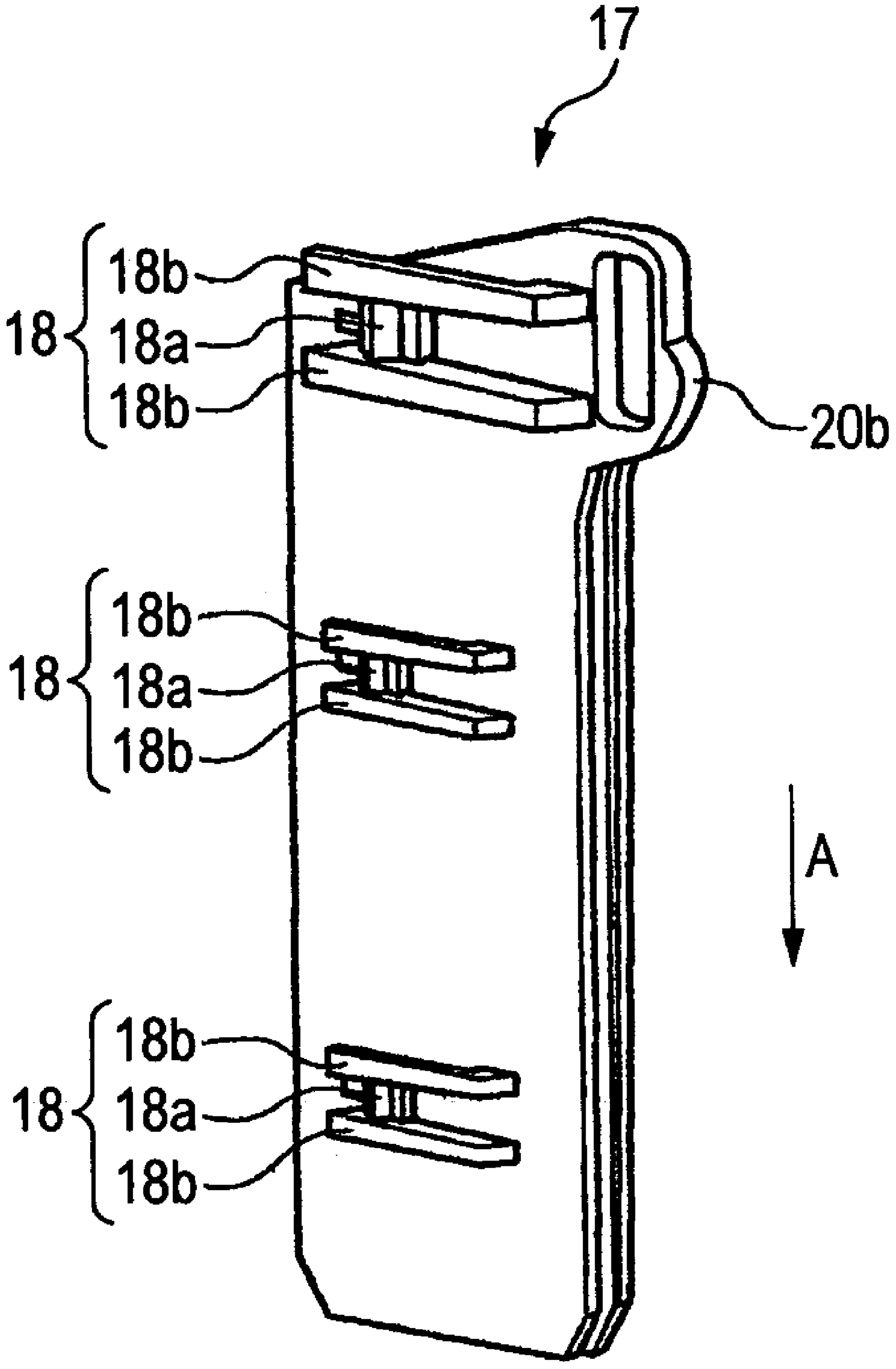
FIG. 5 is a perspective view of a connector holding plate.
Figure 6:
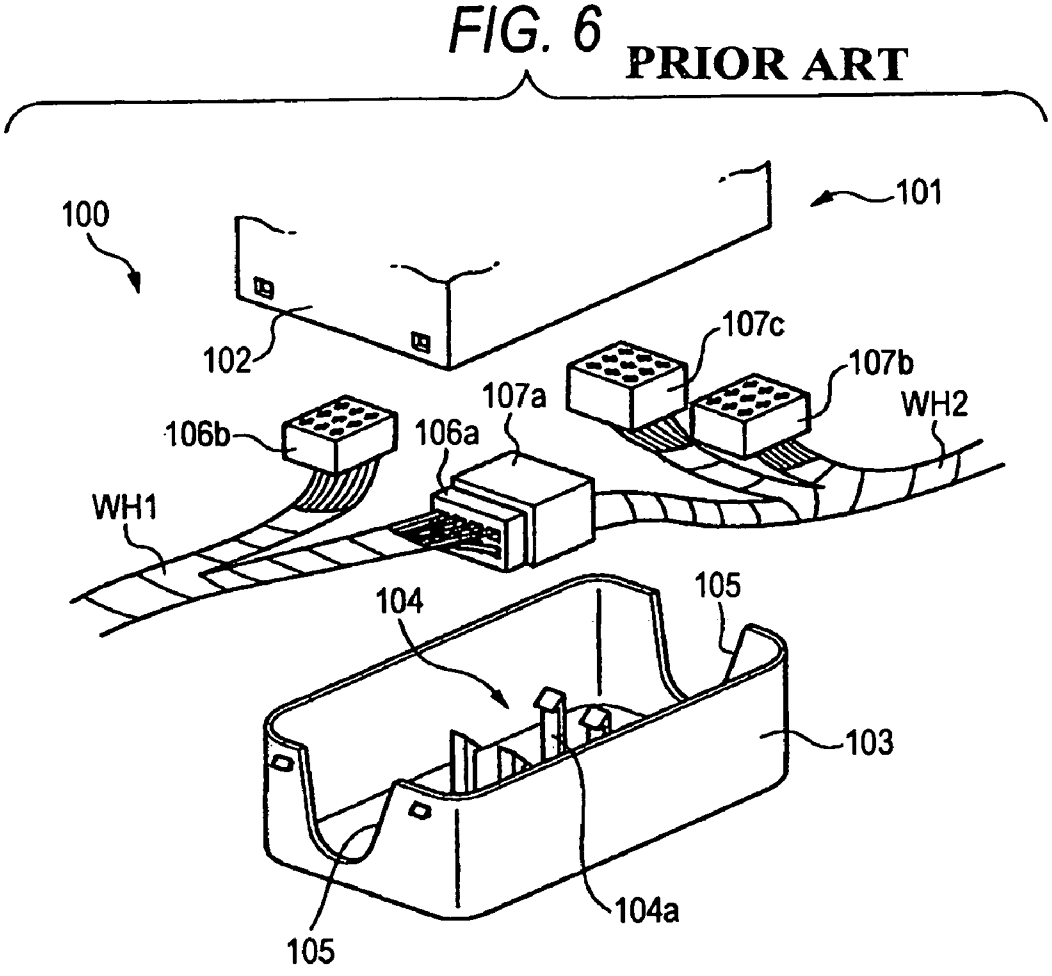
FIG. 6 PRIOR ART
FIG. 6 is an exploded perspective view of a conventional electric connection box.
Figure 7:
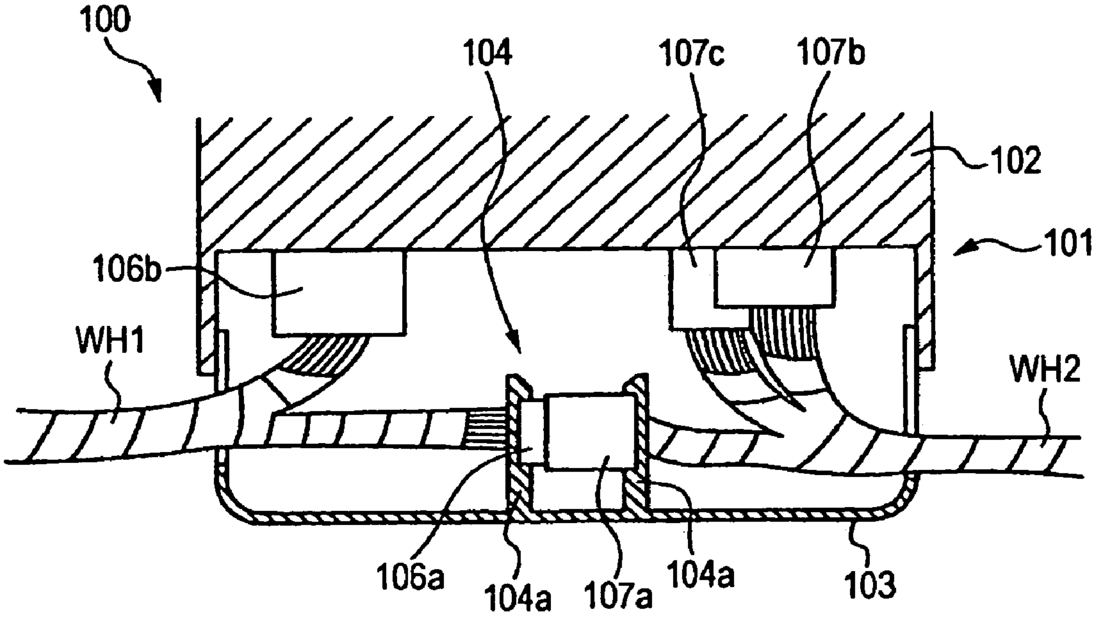
FIG. 7 PRIOR ART
FIG. 7 is a cross-sectional view of the conventional electric connection box.

FIGS. 1 to 5 show one preferred embodiment of the invention, and FIG. 1 is an exploded perspective view of an electric connection box 1, FIG. 2 is an exploded perspective view of a case 2, FIG. 3 is an exploded perspective view of an important portion of the electric connection box 1, FIG. 4 is a plan view showing a condition in which coupled connectors are received within the electric connection box, and FIG. 5 is a perspective view of a connector holding plate 17.

As shown in FIGS. 1 and 2, the electric connection box 1 comprises the case 2 which is formed into a water-tight structure so as to prevent water from intruding into the case 2. The case 2 includes a case body 3 with an open top, and a first cover 4 and a second cover 5 which are attached to the case body 3 to close the open top of this case body 3.

The interior of the case body 3 is broadly divided or partitioned into two part-receiving chambers 7*a* and 7*b* by a partition wall 6. Relay blocks 8 or the like are received in the two part-receiving chambers 7*a* and 7*b*, respectively. The two part-receiving chambers 7*a* and 7*b* communicate with each other via a communication passageway 9. Utilizing this communication passageway 9, second wire harnesses WH2 are installed over a region including the two part-receiving chambers 7*a* and 7*b*.

Two harness notch grooves 10 and 11 (which are open upwardly) are formed in a side wall of the case body 3, and water stop covers 12 and 13 are slid from the upper side, and are attached respectively to the harness notch groove portions 10 and 11. When the water stop covers 12 and 13 are thus attached, harness inlet/outlet ports 14*a*, 14*b*, 15*a* and 15*b* for the passage of first and second wire harnesses WH1 and WH2 therethrough are formed respectively by those portions of the harness notch grooves 10 and 11 which are not closed by the water stop covers 12 and 13. The harness inlet/outlet ports 14*a*, 14*b*, 15*a* and 15*b* are so sized as to correspond respectively to cross-sectional areas of the first and second wire harnesses WH1 and WH2 (which are to be installed) so that water will not intrude through a gap between each of the harness inlet/outlet ports 14*a*, 14*b*, 15*a* and 15*b* and the corresponding wire harness WH1, WH2.

As shown in detail in FIGS. 3 and 4, a pair of slide rail portions 16 are formed on an inner surface of the side wall of the case body 3, and extend downwardly in a direction perpendicular to a direction of installation of the first and second wire harnesses WH1 and WH2, that is, extends downwardly from the vicinity of the open top (opening) of the case 2 toward the bottom of the case 2. The connector holding plate 17 is slidably mounted on the pair of slide rail portions 16.

As shown in detail in FIGS. 3 to 5, the connector holding plate 17 has a narrow elongate plate-like shape, and three connector fixing portions 18 are formed on one side (or surface) of the connector holding plate 17, and are spaced from one another in a direction of sliding of this plate 17. Each of the connector fixing portions 18 includes an elastic retaining portion 18*a*, and fitting guide plates 18*b* corresponding in size to each other in a right-left direction. Second connectors 22*a*, 22*b* and 22*c* (described later) are slid along the surface of the connector holding plate 17, and are fixed respectively to the corresponding connector fixing portions 18. With respect to the three second connectors 22*a*, 22*b* and 22*c* fixed to the connector holding plate 17, the trailing-side connector and the central-side connector (with respect to the direction A of sliding insertion of the connector holding plate 17) have the same height, while the leading-side connector is smaller in height than these connectors. Namely, the three connectors are so arranged that these connectors decreases in height from the trailing side toward the leading side in the direction A of sliding insertion. Therefore, a step D is formed between the central-side second connector 22*b* and the leading-side second connector 22*a*.

Plate locking device 20 includes an engagement portion 20*a* formed at that portion of the slide rail portion 16 disposed in a vicinity of the open top (opening) of the case body 3, and an elastic retaining portion 20*b* formed at a trailing end of the connector holding plate 17 in the sliding direction. Namely, the plate locking device 20 is provided in a vicinity of the open top (opening) of the case body 3. The plate locking device 20 locks the connector holding plate 17 against sliding movement when the connector holding plate 17 reaches a sliding-completed position.

Any hole is not formed through the bottom of the case body 3.

One or more first connectors 21*a*, 21*b*, 21*c*, etc., are connected to an end portion of each of the first wire harnesses WH1. The end portions of the first wire harnesses WH1 are passed respectively through the harness inlet/outlet ports 14*a* and 14*b* into the case 2, so that the first connectors 21*a*, 21*b*, 21*c*, etc., are received within the case 2. Among the first connectors received within the case 2, the three first connectors 21*a*, 21*b* and 21*c* for wire harness-joining purposes are coupled respectively with the second connectors 22*a*, 22*b* and 22*c*. The other first connectors (not shown) are coupled respectively with connector portions (not shown) formed integrally with the relay blocks 8 or the like.

One or more second connectors 22*a*, 22*b*, 22*c*, etc., are connected to an end portion of each of the second wire harnesses WH2. The end portions of the second wire harnesses WH2 are passed respectively through the harness inlet/outlet ports 15*a* and 15*b* into the case 2, so that the second connectors 22*a*, 22*b*, 22*c*, etc., are received within the case 2. Among the second connectors received within the case 2, the three second connectors 22*a*, 22*b* and 22*c* have respective engagement portions (not shown) formed on their surfaces facing the connector holding plate 17, and these engagement portions are retainingly engaged respectively with the connector fixing portions 18, so that the second connectors 22*a*, 22*b* and 22*c* are fixed to the connector holding plate 17. The first connectors 21*a*, 21*b* and 21*c* for wire harness-joining purposes are coupled respectively with the second connectors 22*a*, 22*b* and 22*c* as described above. The other second connectors (not shown) are coupled respectively with connector portions (not shown) formed integrally with the relay blocks or the like.

Next, an operation for introducing the first and second connectors 21*a*, 21*b*, 21*c*, 22*a*, 22*b* and 22*c* into the electric connection box 1, as well as an operation for removing the received first and second connectors 21*a*, 21*b*, 21*c*, 22*a*, 22*b* and 22*c*, will be described.

First, the second connectors 22*a*, 22*b* and 22*c* are fixed to the connector fixing portions 18 of the connector holding plate 17, respectively. At this time, the second connectors 22*a*, 22*b* and 22*c* are fixed respectively in the predetermined positions on the basis of their heights as described above. Then, the first connectors 21*a*, 21*b* and 21*c* are coupled with the second connectors 22*a*, 22*b* and 22*c*, respectively.

Then, the leading end of the connector holding plate 17 is engaged with upper ends of the slide rail portions 16, and in this condition the connector holding plate 17 is slid along the slide rail portions 16, and is inserted toward the bottom of the case body 3. Then, the connector holding plate 17 is locked by the plate locking device 20, thus completing this operation. The other first and second connectors (not shown) are coupled respectively with the connector portions (not shown) of the relay blocks 8 or the like.

Thus, the plurality of pairs of coupled first and second connectors 21*a*, 21*b*, 21*c*, 22*a*, 22*b* and 22*c* (hereinafter referred to as "coupled connectors") are fixed to the case body 3. After this connector fixing operation, the first and second wire harnesses WH1 and WH2 are located at lower portions of the harness notch grooves 10 and 11, and the water stop covers 12 and 13 are slid to be attached respectively to the harness notch grooves 10 and 11, so that the first and second wire harnesses WH1 and WH2 are disposed respectively in the harness inlet/outlet ports 14*a*, 14*b*, 15*a* and 15*b*. Finally, the first and second covers 4 and 5 are attached to the upper side of the case body 3.

For removing the coupled connectors 21*a*, 21*b*, 21*c*, 22*a*, 22*b* and 22*c* from the electric connection box 1, the first and second covers 4 and 5 are removed from the case body 3. Then, the water stop covers 12 and 13 are slightly moved upwardly beyond the upper side of the case body 3, or are removed from the case body 3. Then, the locked condition of the plate locking device 20 is cancelled, and the connector holding plate 17 is pulled out along the slide rail portions 16. As a result, the connector holding plate 17, together with the coupled connectors 21*a*, 21*b*, 21*c*, 22*a*, 22*b* and 22*c*, is withdrawn from the case body 3. Similarly, the end portions of the first and second wire harnesses WH1 and WH2 are also withdrawn. As described above, the three pairs of coupled connectors 21*a*, 21*b*, 21*c*, 22*a*, 22*b* and 22*c* can be received in a small space within the case 2. And besides, the operation for introducing the three pairs of coupled connectors 21*a*, 21*b*, 21*c*, 22*a*, 22*b* and 22*c* into the electric connection box, as well as the operation for removing these connectors, can be carried out easily.

In this embodiment, the plate locking device 20 is provided at that portion of the case body 3 disposed in a vicinity of the opening of the case body 3, and therefore the hand of the operator can easily reach the plate locking device 20, and therefore the operator can easily carry out the operation for canceling the locked condition of the plate locking device 20.

In this embodiment, the three pairs of coupled connectors 21*a*, 21*b*, 21*c*, 22*a*, 22*b* and 22*c*, fixed to the connector holding plate 17, are so arranged that these connectors decrease in height from the trailing side toward the leading side in the direction A of sliding insertion of the connector holding plate 17. Therefore, during the withdrawal of the connector holding plate 17, the first and second wire harnesses WH1 and WH2 and others will not become caught by the step formed between any two adjacent coupled connectors (21*a*, 21*b*, 21*c*, 22*a*, 22*b* and 22*c*), and therefore this withdrawing operation is not prevented, so that the operation for withdrawing the connector holding plate 17 can be carried out easily.

In this embodiment, any hole is not formed through the bottom of the case body 3, and therefore the intrusion of water into the case 2 can be prevented as much as possible.

In the above embodiment, although the three connector fixing portions 18 are formed on the connector holding plate 17, the number of the connector fixing portions 18 can be two or more than three.

What is claimed is:

1. An electric connection box comprising:

a case;

first and second connectors received with in the case, which are provided at end portions of first and second wire harnesses, respectively, and which are coupled to each other;

a slide rail portion formed on an inner surface of a wall of said case, and extending in a direction substantially perpendicular to a direction of installation of the first and second wire harnesses; and a connector holding plate on which at least one connector fixing portion is provided, wherein at least one pair of said first and second connectors coupled to each other are fixed at said connector fixing portion of said connector holding plate, which is slidably mounted into said slide rail portion.

2. An electric connection box according to claim 1, wherein a plate locking device is provided in a vicinity of an opening of said case to lock said connector holding plate to said case when said connector holding plate reaches a sliding-completed position.

3. An electric connection box according to claim 1, wherein a plural pairs of said first and second connectors are fixed at a plurality of the connector fixing portions of said connector holding plate.

4. An electric connection box according to claim 3, wherein said plural pairs of first and second connectors fixed to said connector holding plate are arranged so that heights of said pairs of said first and second connectors decrease toward a leading end of said connector holding plate.

5. An electric connection box according to claim 1, wherein no hole is formed on a bottom of said case.

* * * * *